US009745116B1

(12) United States Patent
Lopez

(10) Patent No.: US 9,745,116 B1
(45) Date of Patent: Aug. 29, 2017

(54) LAUNDRY RECEPTACLE WITH LIFTING PLATFORM

(71) Applicant: John D Lopez, Apollo Beach, FL (US)

(72) Inventor: John D Lopez, Apollo Beach, FL (US)

( * ) Notice: Subject to any disclaimer, the term of this patent is extended or adjusted under 35 U.S.C. 154(b) by 0 days.

(21) Appl. No.: 15/173,630

(22) Filed: Jun. 4, 2016

(51) Int. Cl.

*B62B 1/14* (2006.01)
*B65D 83/00* (2006.01)
*D06F 95/00* (2006.01)
*B65D 25/28* (2006.01)
*B62B 1/16* (2006.01)
*B62B 1/12* (2006.01)
*B62B 5/06* (2006.01)

(52) U.S. Cl.

CPC .......... *B65D 83/0005* (2013.01); *B62B 1/125* (2013.01); *B62B 1/145* (2013.01); *B62B 1/16* (2013.01); *B62B 5/067* (2013.01); *B65D 25/28* (2013.01); *D06F 95/002* (2013.01)

(58) Field of Classification Search

CPC B62B 1/125; B62B 1/14; B62B 1/145; B62B 5/065; B65F 1/068; B65F 1/1452; B65F 1/12; B65F 1/1405; B65G 1/06; A47B 51/00; A47B 57/06; A47B 90/025; A47B 2220/0013; D06F 95/002

See application file for complete search history.

(56) References Cited

U.S. PATENT DOCUMENTS 609,528 A 8/1898 Wilson
2,528,056 A 11/1949 Henry
3,031,092 A 5/1958 Maskel
3,494,503 A * 2/1970 Kingsley .................. B65G 1/07 312/306
4,140,257 A * 2/1979 Peterson ................ B65D 63/18 206/804
4,248,442 A * 2/1981 Barrett ...................... B62B 3/02 206/505
4,500,145 A 2/1985 Fassauer
5,316,170 A * 5/1994 Brown .................... B65F 1/068 220/495.06
5,645,187 A * 7/1997 Brown .................... B65F 1/068 220/495.06
6,079,759 A * 6/2000 Payne ....................... B65F 1/06 220/495.04
7,100,393 B2 * 9/2006 D'Angelo ............ F25D 31/007 62/372
8,888,112 B2 * 11/2014 Trapnell .................... B62B 1/12 187/244
9,534,834 B1 * 1/2017 Klassen ................. A47B 46/00
2001/0038786 A1 * 11/2001 Kim ........................ B62B 1/002 414/490
2004/0016759 A1 * 1/2004 Shalit ...................... B65F 1/068 220/495.06
2005/0110232 A1 * 5/2005 DiBenedetto ............. B62B 1/14 280/47.29
2006/0157358 A1 7/2006 Heidel
(Continued)

*Primary Examiner* — Katy M Ebner
(74) *Attorney, Agent, or Firm* — Thomas Frost

(57) ABSTRACT

The invention relates a laundry hamper/receptacle having a handle assembly to lift a platform for removal of laundry inside of the hamper. A first handle assembly has singular tubular members with telescoping means connected to a rod affixed to the platform. An alternative handle assembly utilizes a pair of arms providing additional lifting capacity connected to a rod affixed to the platform.

9 Claims, 5 Drawing Sheets

10 2 34 4,5 22 50 24 38 2 60 32 12 32 16 14 30 92 94 36 4,5 20 92

(56) References Cited

U.S. PATENT DOCUMENTS

| | | | | |
|---|---|---|---|---|
| 2008/0098773 | A1* | 5/2008 | Beeks | D06F 95/002 68/235 R |
| 2009/0071964 | A1* | 3/2009 | Phipps | B65F 1/068 220/495.08 |
| 2010/0117499 | A1* | 5/2010 | Fortier | A45C 7/0031 312/306 |
| 2010/0327544 | A1* | 12/2010 | Pebworth | B62B 1/14 280/6.151 |
| 2011/0127737 | A1* | 6/2011 | Lee | B62B 3/003 280/47.26 |
| 2012/0055933 | A1* | 3/2012 | Jones | B65F 1/068 220/495.06 |

* cited by examiner

LAUNDRY RECEPTACLE WITH LIFTING PLATFORM

FIELD OF THE INVENTION

The present invention relates to a laundry hamper having a handle assembly to lift a platform for removal of laundry inside of the hamper.

BACKGROUND OF THE INVENTION

The general purpose of the present invention, which will be described subsequently in greater detail, is to provide a new and improved laundry receptacle.

In the typical household soiled clothing is kept in a hamper/receptacle until removed for cleaning. Removal of the laundry can pose problems, particularly for the elderly or those of limited physical capacity. Additionally the soiled clothing at the bottom of the hamper is difficult to reach.

The present invention permits the lifting of the clothing through the use of a handle and a rod attached to a platform. The platform is lifted to the opening at the top of the hamper for easy access to the clothing stored on the platform. Additionally, a pair of rear wheels allow the receptacle to be transported.

SUMMARY OF THE INVENTION

The device comprises a receptacle having side walls and a base wall with a passage defined opposed to the base wall. A hinged lid is provided. A lifting platform is positioned inside the receptacle. A rod, or alternatively a pair of rods, is attached at one end to the platform, and a handle is affixed to the other end of the rod. The rod is positioned within a conduit formed on the rear exterior of the receptacle. The platform is extendible to rest on the bottom of the receptacle.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
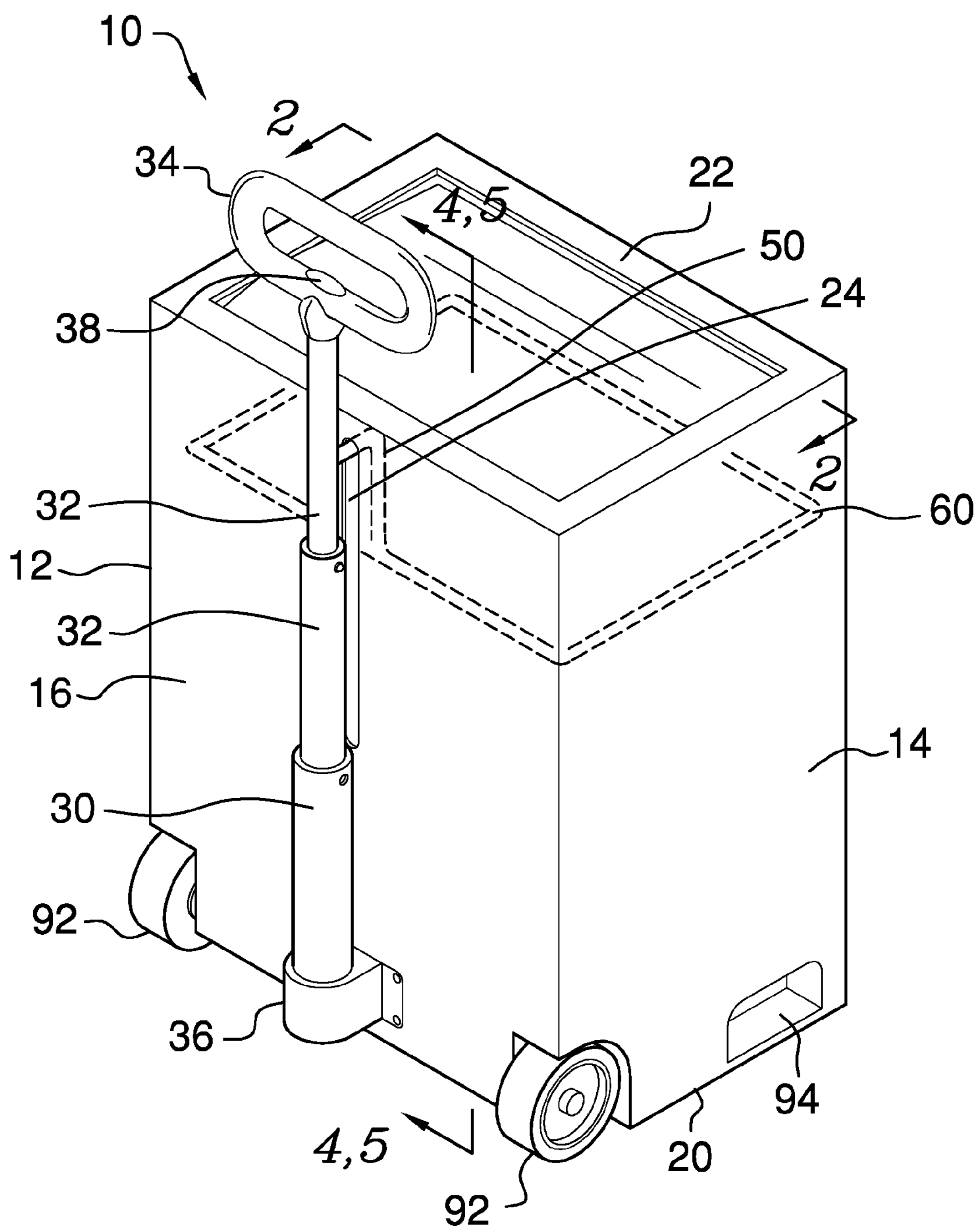
FIG. 1 is a perspective view of the present invention with platform in raised position.
Figure 2:
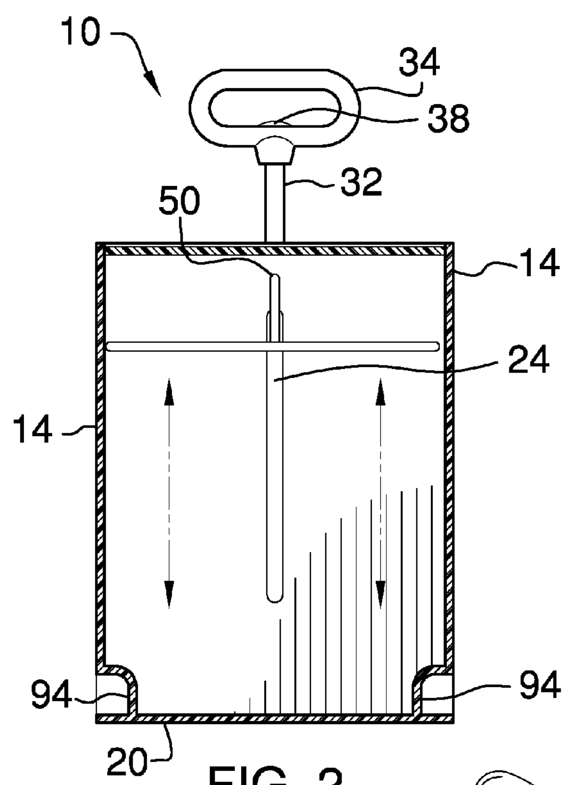
FIG. 2 is a cross-sectional view taken along lines 2-2 in FIG. 1.
Figure 3:
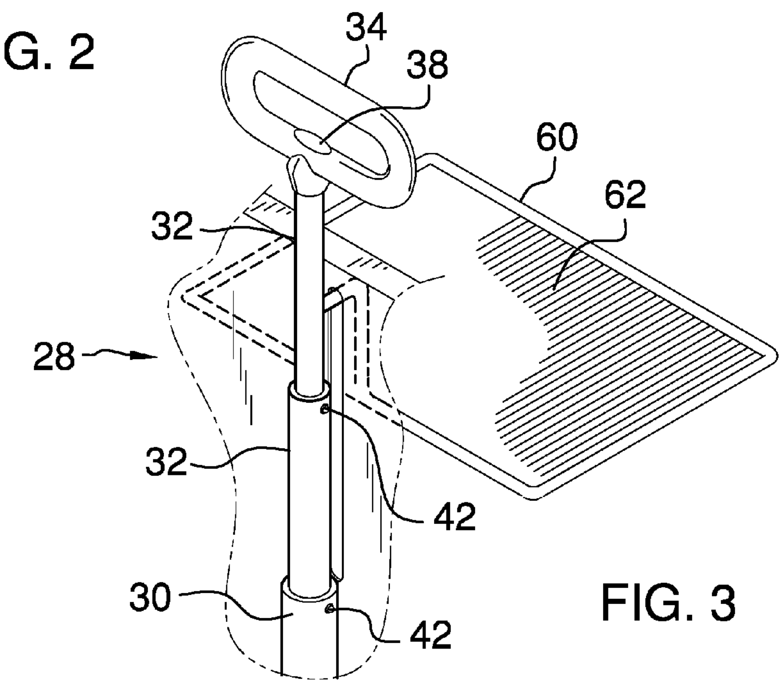
FIG. 3 is a partial view showing handle and platform.

An embodiment of the invention 10 is illustrated in FIGS. 1-7. The apparatus 10 comprises a housing 12 having side walls 14, a rear wall 16, front wall 18, a base wall 20, and an upper rim 22, and further having a vertically extending slot 24 defined through the rear wall 16. The housing 12 has a chamber defined by interior surfaces of the walls. A lid 26 pivotally connected to the housing 12 is provided.

An extendable handle assembly 28 comprises an outer cylindrical member 30, at least one inner cylindrical member 32, a handle grip 34, and a bracket 36, having a cylindrically-shaped cavity defined therein, mounted to an exterior surface of the rear wall 16. The assembly 28 is disposed on the outer surface of the rear wall 16. A first end of the outer cylindrical member 30 is connected to the bracket 36. A button release mechanism 38 is disposed on a lower portion of the handle grip 34. A cable 40 is connected at one end to the button release mechanism 38 and extends vertically downwardly through inner bores of the inner cylindrical member 32 and outer cylindrical member 30 attaching to spring biased pins 42 mounted to the members 30, 32. By engaging the button release mechanism 38, the assembly 28 is extracted and extended through well known telescoping means.

A central rod 50 having an upper end 52 and a lower end 54, with an L-shaped portion integrally formed at the upper end 52, is connected at the upper end to the inner cylindrical member 32 through the slot 24 of the rear wall 16 of the housing 12. The lower end 54 extends perpendicularly from the upper end 52.

A generally rectangular shaped lifting platform 60 having an upper planer surface 62 and a lower planer surface 64 is horizontally positioned inside the housing 12. The lower end 54 of the central rod 50 is attached to the platform 60. The platform 60 is of a predetermined size to fit snugly abutting the inner surfaces of the walls of the housing 12, so to insure that clothing will not fall below the platform 60 to the bottom of the housing 12 and make it difficult to retrieve the clothing.

Figure 4:
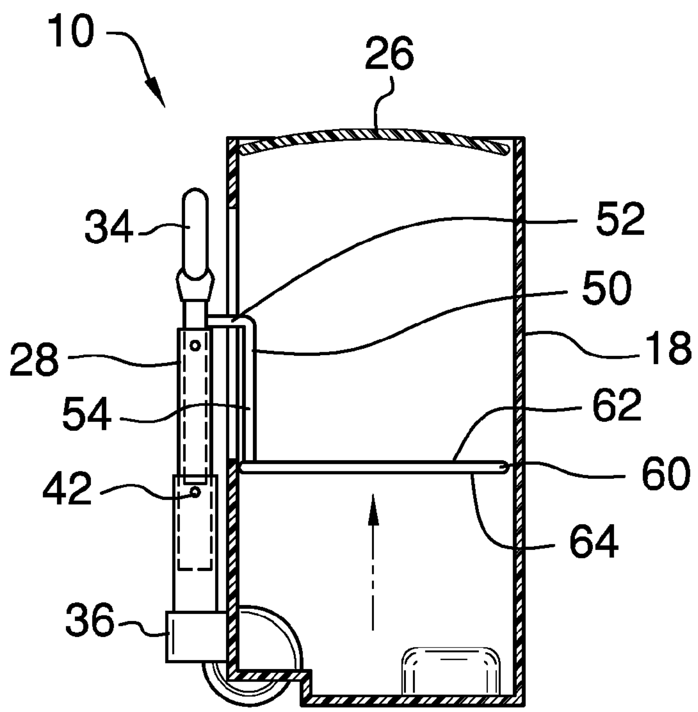
FIG. 4 is a cross-sectional view taken along lines 4-4 in FIG. 1.
Figure 5:
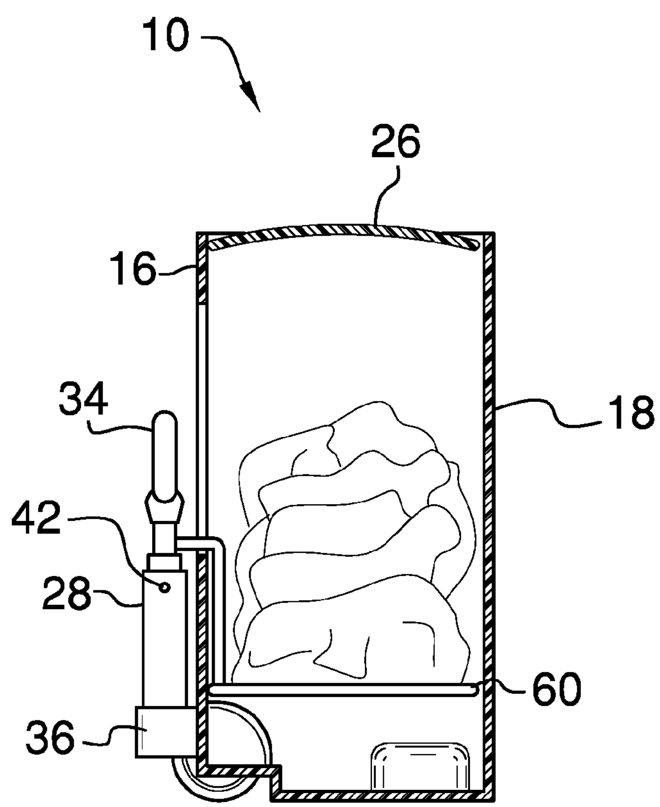
FIG. 5 is a cross-sectional view taken along lines 5-5 in FIG. 1.
Figure 6:
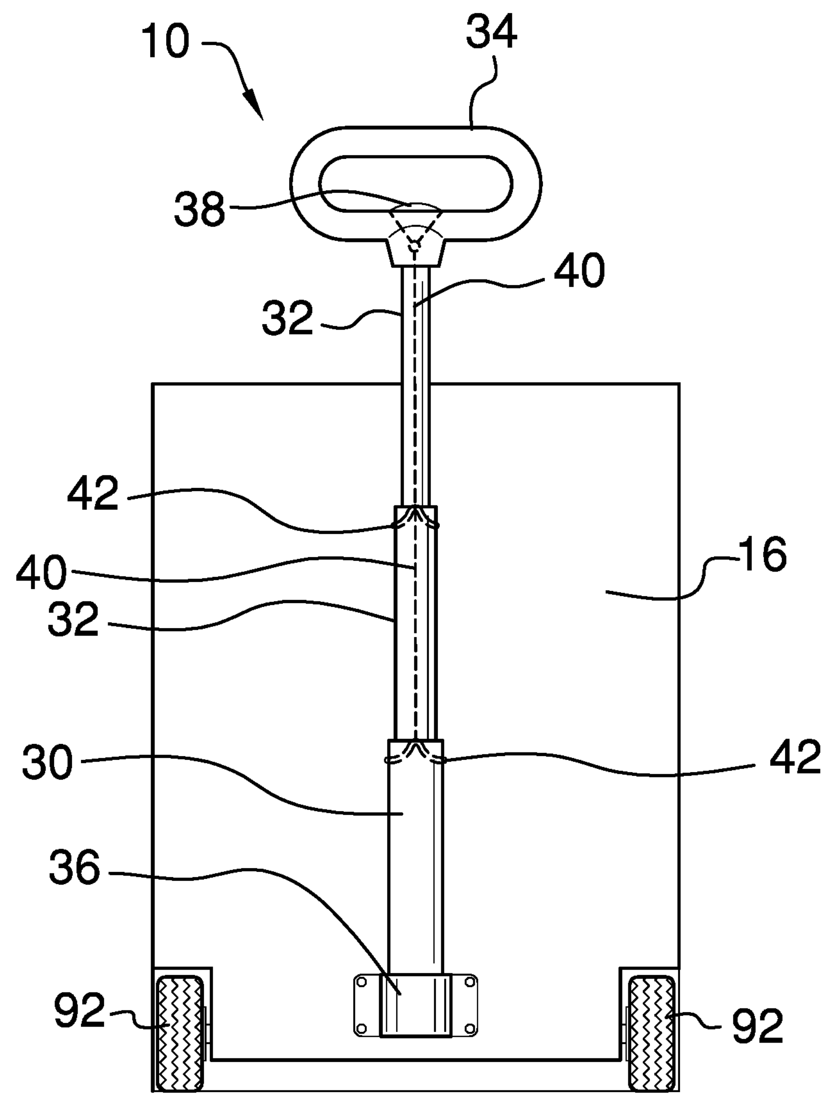
FIG. 6 is a rear elevational view of the invention with retractable handle.

As illustrated in FIGS. 4 and 5, in use, soiled clothing is placed on the platform 60. To retrieve the clothing for cleaning, the button release mechanism 38 is pushed, thereby disengaging the pins 42. The handle grip 34 is pulled upwardly until a preferred position of the platform 60 is locked in place.

Figure 7:
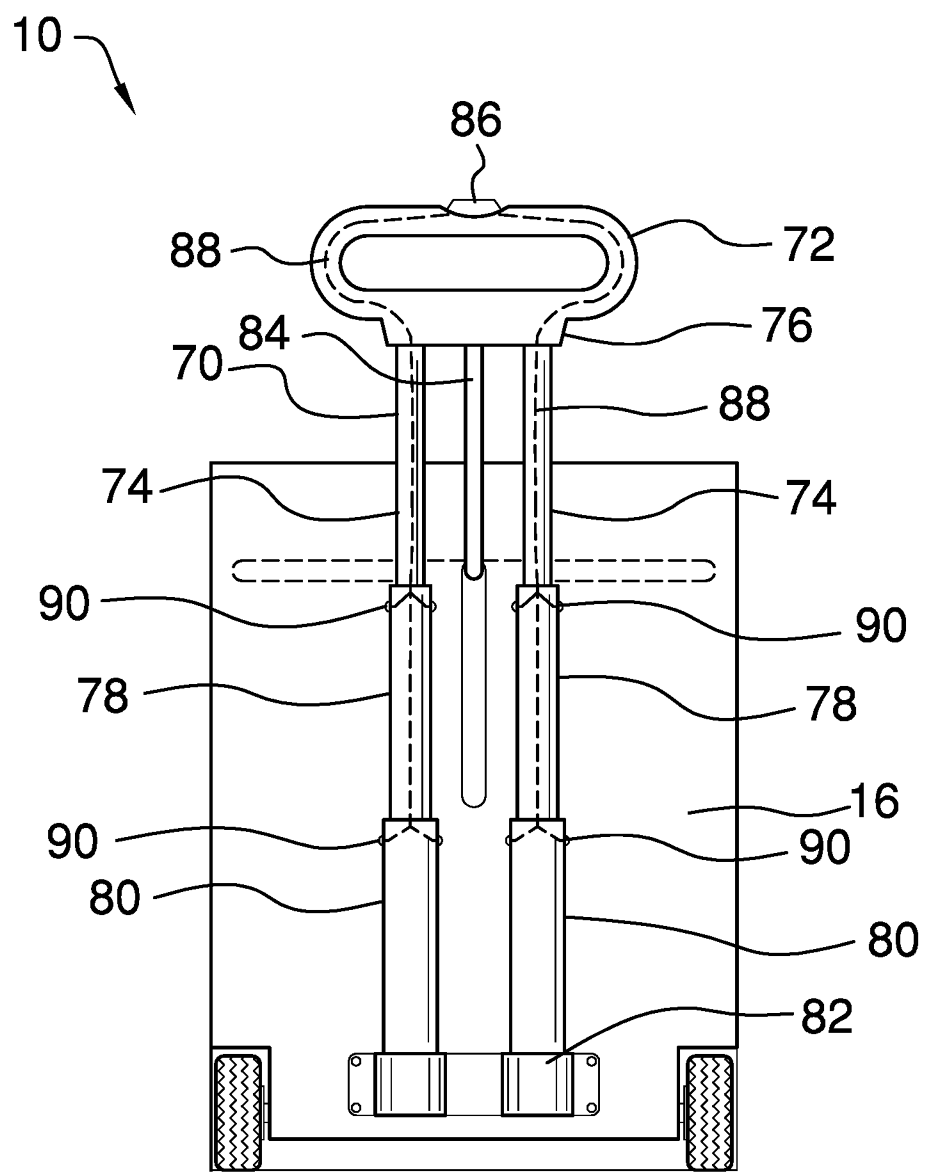
FIG. 7 is a rear elevational view of the invention with a handle and a pair of rods.

An alternative handle assembly 70 disposed on the exterior surface of the rear wall 16 is illustrated in FIG. 7. The assembly 70 comprises a generally oblong shaped handle 72 having inner and outer walls with a passage defined therethrough, and a chamber defined by inner walls, and a pair of tubular vertical lifting arms 74 aligned parallel to each other integrally formed at opposed ends of a bottom portion 76 of the handle 72. The arms 74 have inner and outer walls having a bore defined therethrough in continuous connection with the chamber of the handle 72. A pair of inner cylindrical members 78, having first and second ends, are aligned parallel to each other and mated at the first end to the complementary arm 74. A pair of outer cylindrical members 80, having first and second ends, are aligned parallel to each other and mated to the second end of the inner cylindrical members 78. The second ends of the outer cylindrical members 80 are mounted to a bracket 82 affixed to the exterior surface of the rear wall 16 juxtaposed the base wall 20. Spring loaded lock pins 90 are positioned juxtaposed the first ends of the inner cylindrical members 78 and the outer cylindrical members 80.

A central rod 84 is integrally formed on a lower portion of the handle 72 medially between the arms 74. The rod 84 is connected through the slot 24 of the rear wall 16 to the platform 60. A release button 86 is disposed on an upper portion of the handle 72. Cable 88 is connected to the release button 86, and extends through the interior of the handle 72 and arms 74, connecting to the spring loaded lock pins 90.

When the release button 86 is engaged the pins 90 are moved, and the handle 72, and thus the platform 60, are extendable through well known telescoping means.

A pair of wheels 92 allow the apparatus 10 to easily be transported. A pair of hollowed indentations 94 fashioned for placement of a foot are formed relative the lowermost portion of the exterior surface of the side walls 14 of the housing 12. The placement of the foot allows for stabilization while the platform 60 is being raised or lowered.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

I claim:

1. A laundry hamper apparatus, comprising in combination:

a housing having side walls, a rear wall, front wall, a base wall, and an upper rim defining an interior chamber; and further having a vertically extending slot defined through the rear wall;

a handle assembly having extendable telescoping means disposed on an exterior surface of the rear wall of the housing;

a rod having a first end connected to the handle assembly and extending through the slot of the rear wall; and a platform positioned within the interior chamber of the housing connected to a second end of the rod, and whereby the platform is raised and lowered by the handle assembly.

2. The apparatus as set forth in claim 1, whereby the handle assembly comprises a handle grip, at least one inner cylindrical member connected to the handle grip, an outer cylindrical member mateable with the inner cylindrical member, a button release mechanism disposed on the handle grip, spring biased pins mounted to the inner cylindrical member and outer cylindrical member, and cable connected to the handle grip and attached to the pins, to raise and lower the assembly.

3. The apparatus as set forth in claim 2, whereby the handle assembly further comprises a bracket mounted to the rear wall and connected to the outer cylindrical member.

4. The apparatus as set forth in claim 1, whereby the rod has an upper end with an L-shaped portion and a lower end extending perpendicularly from the upper end and connected to the platform.

5. The apparatus as set forth in claim 4, further comprising a pair of wheels mounted juxtaposed the rear wall of the housing.

6. A laundry hamper apparatus, comprising in combination:

a housing having side walls, a rear wall, front wall, a base wall, and an upper rim defining an interior chamber; and further having a vertically extending slot defined through the rear wall;

a handle assembly disposed on the exterior surface of the rear wall of the housing having a handle, a pair of tubular arms aligned parallel to each other integrally formed at opposed ends of a bottom portion of the handle, a pair of inner cylindrical members aligned parallel to each other and each mated with one of the arms, and a pair of outer cylindrical members aligned parallel to each other and each mated with a complementary inner cylindrical member;

a central rod having a first end connected to the handle and extending through the slot of the rear wall; and a platform positioned within the interior chamber of the housing connected to a second end of the rod, and whereby the platform is raised and lowered by the handle assembly.

7. The apparatus as set forth in claim 5, whereby the handle assembly further comprises a release button disposed on an upper portion of the handle, cable connected to the release button, and spring loaded pins mounted to the inner cylindrical member and outer cylindrical members and connected to the cable.

8. The apparatus as set forth in claim 6, whereby the handle assembly further comprises a bracket mounted to the rear wall and connected to the outer cylindrical members.

9. The apparatus as set forth in claim 7, further comprising indentations for foot placement formed on an exterior surface of the side walls of the housing.

* * * * *